United States Patent
Farjami

(10) Patent No.: US 9,766,655 B2
(45) Date of Patent: Sep. 19, 2017

(54) WRISTBAND ACCESSORIES WITH AN EARPIECE FOR A WEARABLE COMPUTER

(71) Applicant: Farshad Farjami, Mission Viejo, CA (US)

(72) Inventor: Farshad Farjami, Mission Viejo, CA (US)

( * ) Notice: Subject to any disclaimer, the term of this patent is extended or adjusted under 35 U.S.C. 154(b) by 485 days.

(21) Appl. No.: 14/188,591

(22) Filed: Feb. 24, 2014

(65) Prior Publication Data

US 2015/0241913 A1    Aug. 27, 2015

Related U.S. Application Data

(63) Continuation of application No. 14/187,144, filed on Feb. 21, 2014, now abandoned.

(51) Int. Cl.
| | |
|---|---|
| G06F 1/16 | (2006.01) |
| H05B 33/08 | (2006.01) |
| H04M 1/725 | (2006.01) |

(52) U.S. Cl.
CPC .............. G06F 1/163 (2013.01); G06F 1/16 (2013.01); G06F 1/1635 (2013.01); G06F 1/1656 (2013.01); G06F 1/1683 (2013.01); H05B 33/0803 (2013.01); H05B 33/086 (2013.01); H05B 33/0863 (2013.01); H04M 1/7253 (2013.01)

(58) Field of Classification Search
CPC ........................................ G06F 1/16
USPC ................................ 361/679.03
See application file for complete search history.

(56) References Cited

U.S. PATENT DOCUMENTS

| | | | | | |
|---|---|---|---|---|---|
| 5,381,387 | A | * | 1/1995 | Blonder | G04B 47/025 368/10 |
| 5,467,324 | A | * | 11/1995 | Houlihan | G04B 47/025 368/10 |
| 5,872,744 | A | * | 2/1999 | Taylor | G04G 17/083 224/164 |
| 5,881,149 | A | * | 3/1999 | Weatherill | H04M 1/05 379/430 |
| 6,035,035 | A | * | 3/2000 | Firooz | H04B 1/385 379/433.1 |
| 6,142,368 | A | | 11/2000 | Mullins | |
| 6,249,487 | B1 | * | 6/2001 | Yano | G01S 19/34 342/357.74 |
| 6,619,836 | B1 | * | 9/2003 | Silvant | G04G 17/08 368/281 |
| 6,775,205 | B1 | * | 8/2004 | Sporn | G04B 47/00 368/10 |

(Continued)

*Primary Examiner* — David Warren
(74) *Attorney, Agent, or Firm* — Farjami & Farjami LLP

(57) ABSTRACT

There is provided a wristband for attaching to a computer device. The wristband includes a first end of the wristband configured to attach to a first side of the computer device, a second end of the wristband configured to attach to a second side of the computer device, and an earpiece compartment for placing an earpiece in the wristband. The wristband can be configured to provide power to the earpiece while the earpiece is placed inside the wristband. The wristband may further include a battery, and wherein the battery of the wristband provides power to a battery of the earpiece. The wristband may also include, wherein the clasp has a switch that is activated in response to a closure of the clasp causing a signal to be transmitted by the wristband to the computer device.

12 Claims, 6 Drawing Sheets

(56) References Cited

U.S. PATENT DOCUMENTS

| | | | | |
|---|---|---|---|---|
| 6,801,476 B2* | 10/2004 | Gilmour | H04B 1/385 | 368/10 |
| 8,098,141 B2* | 1/2012 | Vanska | G06F 1/163 | 340/407.1 |
| 8,140,131 B1* | 3/2012 | Green | H04B 1/385 | 368/10 |
| 8,142,357 B2* | 3/2012 | Suyama | A61B 5/02055 | 368/11 |
| 8,279,716 B1* | 10/2012 | Gossweiler, III | H04M 1/72552 | 368/10 |
| 8,345,414 B2* | 1/2013 | Mooring | G04G 17/04 | 248/441.1 |
| 8,467,270 B2* | 6/2013 | Gossweiler, III | G04G 17/06 | 345/173 |
| 8,674,835 B2* | 3/2014 | Klein | A01K 11/006 | 340/572.8 |
| 8,714,421 B2* | 5/2014 | Norling | A45F 5/00 | 224/197 |
| 8,787,119 B2* | 7/2014 | Sorias | G04C 10/00 | 368/204 |
| 8,854,927 B2* | 10/2014 | Liao et al. | G04G 13/021 | 368/250 |
| 8,902,714 B2* | 12/2014 | Gossweiler, III | G04G 21/08 | 368/10 |
| 8,972,722 B2* | 3/2015 | Faaborg | G06F 21/00 | 340/568.1 |
| 8,976,965 B2* | 3/2015 | Aminzade | H04L 41/0816 | 380/258 |
| 9,122,250 B2* | 9/2015 | Hoffman | G04F 10/00 | |
| 9,141,087 B2* | 9/2015 | Brown | G04F 10/00 | |
| 9,189,022 B2* | 11/2015 | Burgess | G06F 1/163 | |
| 9,277,791 B2* | 3/2016 | Yue | A44C 5/2071 | |
| 2001/0043514 A1* | 11/2001 | Kita | A44C 5/0015 | 368/281 |
| 2002/0070275 A1 | 6/2002 | Mullins | | |
| 2003/0164389 A1* | 9/2003 | Byers | A44C 5/0007 | 224/221 |
| 2004/0056088 A1 | 3/2004 | Mullins | | |
| 2005/0089186 A1* | 4/2005 | Kulas | H04M 1/0258 | 381/384 |
| 2005/0237704 A1* | 10/2005 | Ceresoli | G06F 1/163 | 361/679.03 |
| 2005/0243522 A1* | 11/2005 | Nilsen | H04B 1/3816 | 361/716 |
| 2006/0245585 A1* | 11/2006 | Yin | G06F 1/1616 | 379/430 |
| 2007/0064542 A1* | 3/2007 | Fukushima | G04B 37/1486 | 368/282 |
| 2007/0141915 A1* | 6/2007 | Kim | H01R 13/6608 | 439/640 |
| 2007/0279852 A1* | 12/2007 | Daniel | A44C 5/0007 | 361/679.03 |
| 2008/0009329 A1* | 1/2008 | Adler | H04M 1/0258 | 455/575.1 |
| 2009/0017881 A1* | 1/2009 | Madrigal | H04M 1/0258 | 455/575.1 |
| 2009/0164219 A1* | 6/2009 | Yeung | G04C 3/002 | 704/258 |
| 2009/0213323 A1* | 8/2009 | Hermanson | G02C 11/04 | 351/158 |
| 2012/0194976 A1* | 8/2012 | Golko | G06F 1/163 | 361/679.01 |
| 2013/0107674 A1 | 5/2013 | Gossweiler | | |
| 2013/0120459 A1 | 5/2013 | Dickinson | | |
| 2013/0217434 A1* | 8/2013 | Chou | H04W 88/02 | 455/552.1 |
| 2013/0222270 A1 | 8/2013 | Winkler | | |
| 2013/0234850 A1 | 9/2013 | Lee | | |
| 2013/0237290 A1* | 9/2013 | Simmons, Jr. | H04B 1/3888 | 455/569.1 |
| 2014/0077946 A1 | 3/2014 | Tran | | |
| 2014/0188516 A1 | 7/2014 | Kamen | | |
| 2015/0130623 A1 | 5/2015 | Robison | | |
| 2015/0241912 A1 | 8/2015 | Farjami | | |
| 2015/0241914 A1* | 8/2015 | Farjami | G06F 1/163 | 361/679.03 |
| 2015/0241922 A1* | 8/2015 | Farjami | G06F 1/1635 | 361/679.03 |
| 2015/0366518 A1* | 12/2015 | Sampson | A61B 5/7221 | 600/301 |

* cited by examiner

WRISTBAND ACCESSORIES WITH AN EARPIECE FOR A WEARABLE COMPUTER

RELATED APPLICATION(S)

This application is a Continuation of U.S. patent application Ser. No. 14/187,144, filed Feb. 21, 2014, and titled "Wristband Accessories for a Wearable Computer."

BACKGROUND

Advances in technology have given people the ability to make faster and smaller computers. Mobile phones and computers can now be built to almost any size including the size of a common watch. Consumers are buying these tiny mobile phones and computers and utilizing them to help in their everyday lives. For example, consumers are now able to purchase mobile phones and computers that can be worn around their wrist like a watch. This gives consumers the ability to always have their mobile phones and computers accessible no matter the task that they are performing.

However, problems can occur when utilizing these wristwatch devices. For example, by building wristwatch devices small, it is often difficult to install batteries inside the wristwatch devices that can hold charges long enough to satisfy consumers' needs. As such, consumers are only able to utilize wristwatch devices for a short period of time before they need to be plugged in and recharged. As another example, these wristwatch devices are sold as a complete unit that includes both the wristband and the wearable computer. As such, consumers are not given the opportunity to customize their own wristwatch devices in a way that meets their needs or fashion.

SUMMARY

The present disclosure is directed to wristband accessories with an earpiece for wearable computers, substantially as shown in and/or described in connection with at least one of the figures, as set forth more completely in the claims.

DETAILED DESCRIPTION

Figure 1:
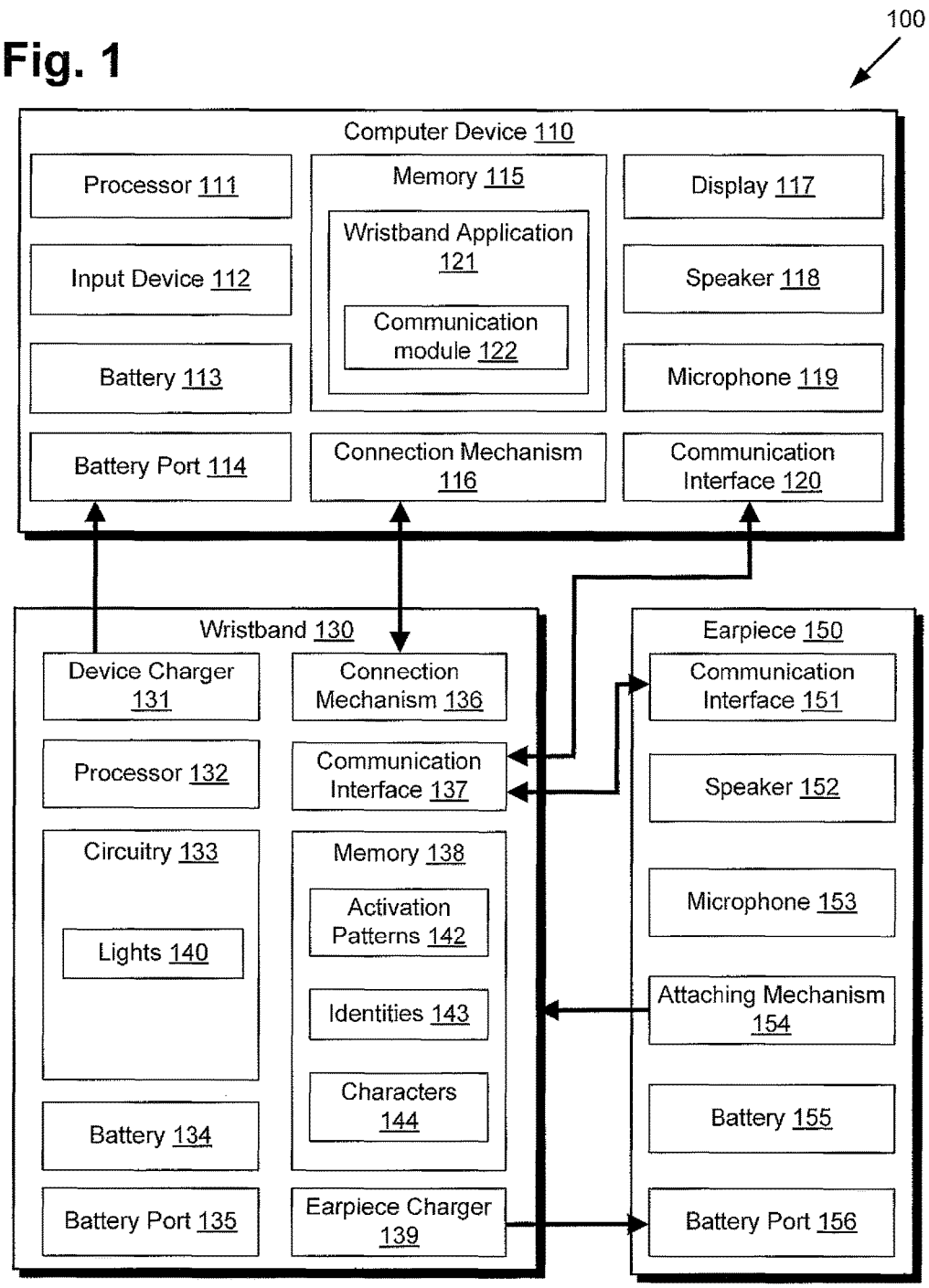
FIG. 1 presents a system for utilizing a wristband accessory with a wearable computer, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for utilizing a wristband accessory with a wearable computer, according to one implementation of the present disclosure. System 100 includes computer device 110, wristband 130, and earpiece 150. Computer device 110 includes processor 111, input device 112, battery 113, battery port 114, memory 115, connection mechanism 116, display 117, speaker 118, microphone 119, and communication interface 120. Memory 115 includes wristband application 121, which is a software running on processor 111 of computer device 110 and includes communication module 122. Wristband 130 includes device charger 131, processor 132, circuitry 133, battery 134, battery port 135, connection mechanism 136, communication interface 137, memory 138, earpiece charger 139, and lights 140. Circuitry 133 may control lights 140 and charging of battery 134. Memory 138 includes activation patterns 142, identities 143, and characters 144. Earpiece 150 includes communication interface 151, speaker 152, microphone 153, attaching mechanism 154, battery 155, and battery port 156.

Figure 2:
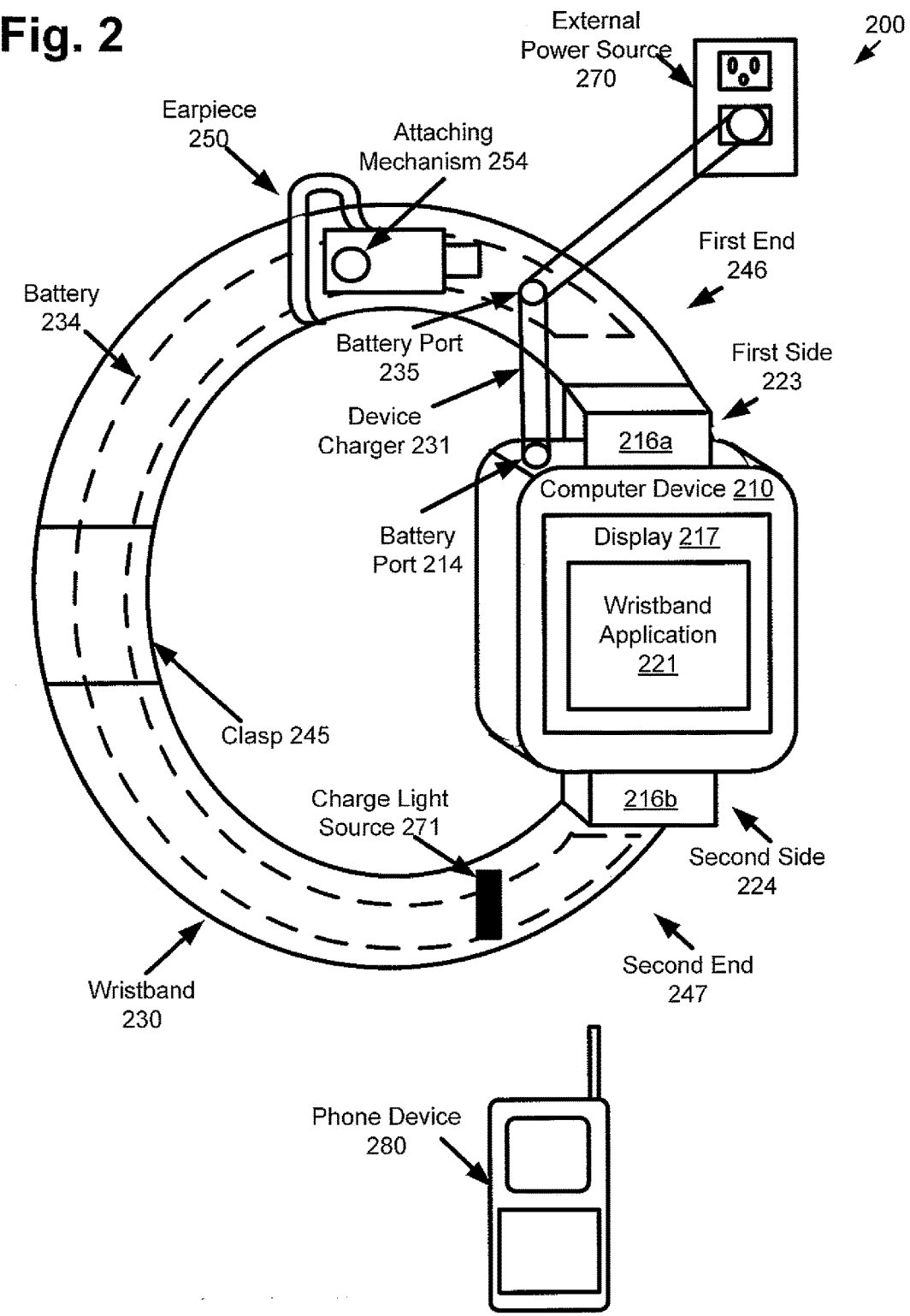
FIG. 2 presents a first system illustrating a wristband accessory connected to a wearable computer, according to one implementation of the present disclosure.
Figure 3:
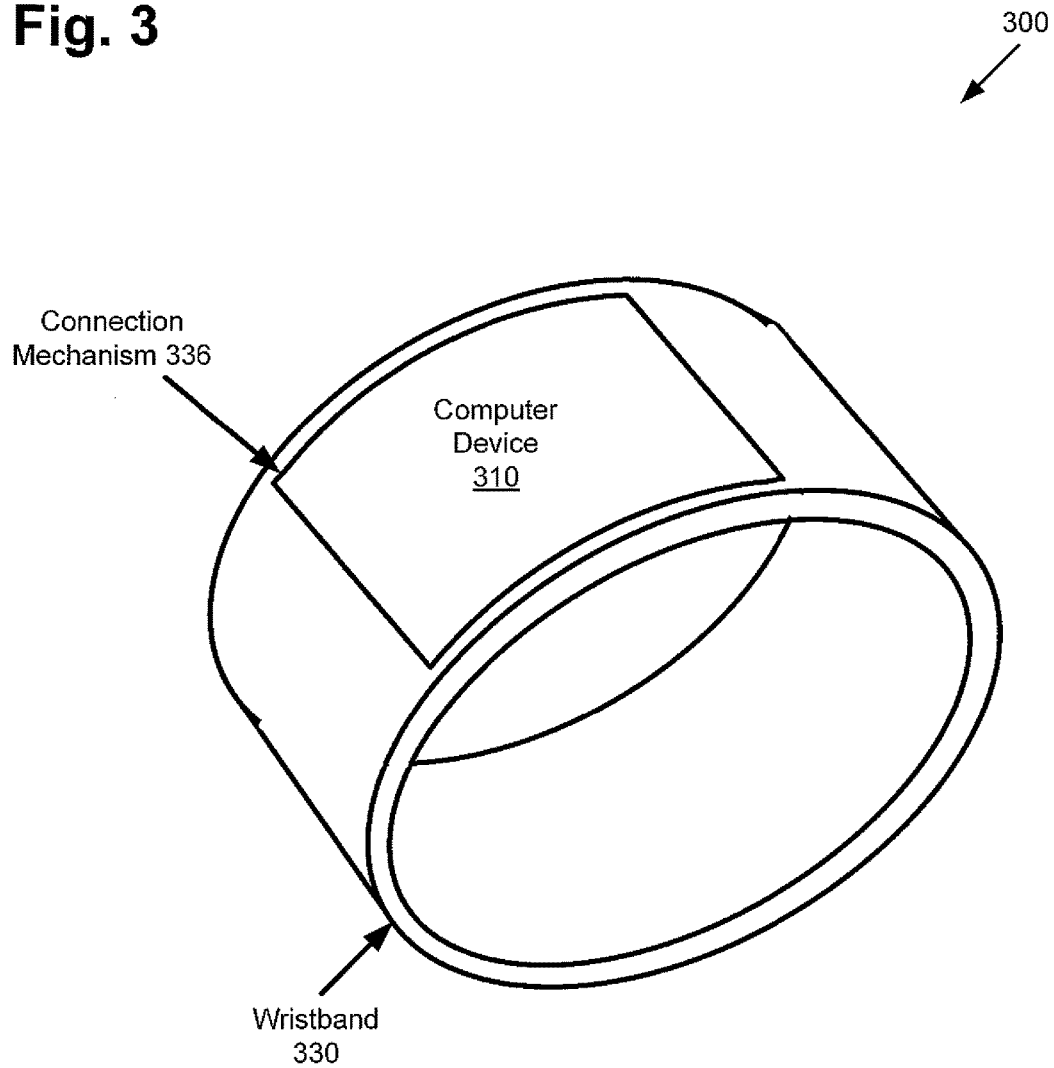
FIG. 3 presents a second system illustrating a wristband accessory connected to a wearable computer, according to one implementation of the present disclosure.
Figure 4:
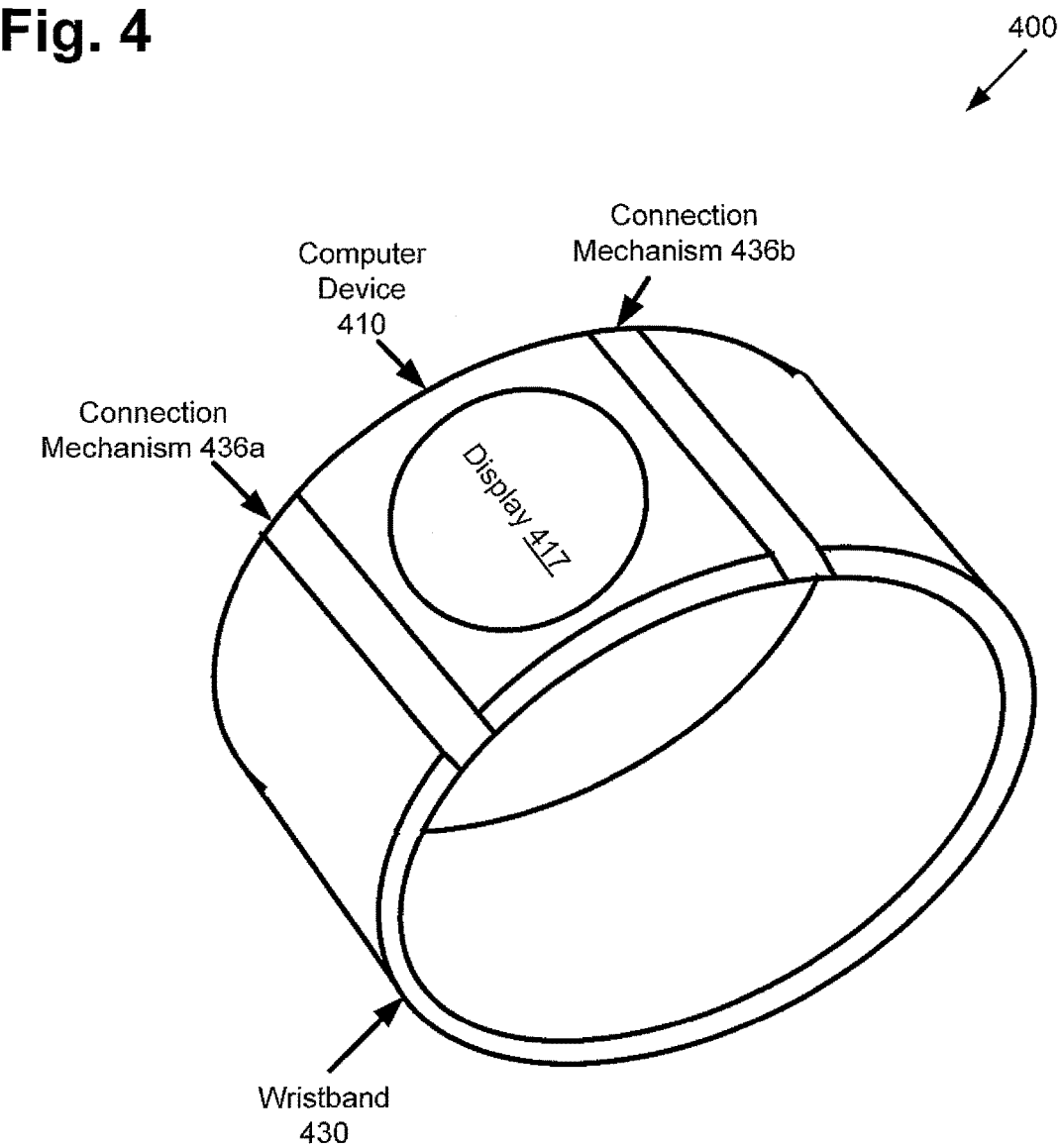
FIG. 4 presents a third system illustrating a wristband accessory connected to a wearable computer, according to one implementation of the present disclosure.

As illustrated in FIG. 1, system 100 shows three different devices including computer device 110, wristband 130, and earpiece 150. Computer device 110 may include any device, which has a computer processor and a communication interface and is capable of being attached to the wrist of a user. Wristband 130 may include a device capable of connecting to computer device 110 so that computer device 110 is secured to the wrist of the user, as illustrated in FIGS. 2-4. Finally, earpiece 150 may include a device that is capable of being worn or placed in the ear of the user, so that the user can communicate hands free with computer device 110 and/or wristband 130.

As further illustrated in FIG. 1, computer device 110, wristband 130, and earpiece 150 may communicate with each other using communication interface 120, communication interface 137, and communication interface 151, respectively. Each of communication interface 120, communication interface 137, and communication interface 151 may include, but are not limited to, a Universal Serial Bus (USB), Serial Port, Local Area Network (LAN), Portable Digital Media Interface (PDMI), Wireless Fidelity (Wi-Fi), Worldwide Interoperability for Microwave Access (WiMax), ZigBee, Bluetooth, Code Division Multiple Access (CDMA), Evolution-Data Optimized (EV-DO), Global System for Mobile Communications (GSM), Long Term Evolution (LTE), and other types of device interface. As such, each of communication interface 120, communication interface 137, and communication interface 151 can communicate with each other using wired and/or wireless device interfaces.

Also illustrated in FIG. 1, computer device 110 connects to wristband 130 using connection mechanism 116 and connection mechanism 136, respectively, and earpiece 150 attaches to wristband 130 using attaching mechanism 154. Each of connection mechanism 116, connection mechanism 136, and attaching mechanism 154 may include, but are not limited to, a snap, a screw, an adhesive, a tie, or any other mechanism that can be used to connect one device to another device. Furthermore, FIG. 1 illustrates that wristband 130 utilizes connection mechanism 136 to connect to connection mechanism 116 of computer device 110, however, the present disclosure is not limited to both wristband 130 and computer device 110 including connection mechanisms. In other implementations, only one of computer device 110 and wristband 130 may include a connection mechanism. For example, in one implementation, wristband 130 may include an adhesive as connection mechanism 136 that sticks to computer device 110. As such, wristband 130 can be utilized with a wide range of devices even if those devices were not specifically designed to be utilized with wristband 130.

It should be noted that the implementation of FIG. 1 illustrates connection mechanism 116 and communication interface 120 of computer device 110, and connection mechanism 136 and communication interface 137 of wristband 130 as separate components, however, the present disclosure is not limited to the implementation of FIG. 1. For example, in one implementation, communication interface 120 of computer device 110 may be built into connection mechanism 116, and communication interface 137 of wristband 130 may be built into connection mechanism 136. In such an implementation, computer device 110 and wristband 130 may communicate with each other through the connection of connection mechanism 116 and connection mechanism 136.

As further illustrated in FIG. 1, wristband 130 includes processor 132 and memory 138. Processor 132 may be configured to access memory 138 to store received input or to execute commands, processes, or programs stored in memory 138, such as activation patterns 142, identities 143, and characters 144. Processor 132 may correspond to a processing device, such as a microprocessor or similar hardware processing device, or a plurality of hardware devices. However, in other implementations processor 132 refers to a general processor capable of performing the functions required of transmitting wristband 130. Memory 138 is a sufficient memory capable of storing commands, processes, and programs for execution by processor 132. Memory 138 may be instituted as ROM, RAM, flash memory, or any sufficient memory capable of storing a set of commands. In other implementations, memory 138 may correspond to a plurality memory types or modules.

Also illustrated in FIG. 1, computer device 110 includes processor 111 and memory 115. Processor 111 and memory 115 of computer device 110 may be similar to processor 132 and memory 138 of wristband 138. For example, processor 111 may be configured to access memory 115 to store received input or to execute commands, processes, or programs stored in memory 115, such as wristband application 121. Processor 111 may correspond to a processing device, such as a microprocessor or similar hardware processing device, or a plurality of hardware devices. However, in other implementations processor 111 refers to a general processor capable of performing the functions required of computer device 110. Memory 115 is a sufficient memory capable of storing commands, processes, and programs for execution by processor 111. Memory 115 may be instituted as ROM, RAM, flash memory, or any sufficient memory capable of storing a set of commands. In other implementations, memory 115 may correspond to a plurality memory types or modules.

It should be noted that when computer device 110 and wristband 130 are in communication with each other, computer device 110 can utilize memory 138 of wristband 130 and wristband 130 can utilize memory 115 of computer device 110. For example, when computer device 110 is in communication with wristband 130, processor 115 of computer device 110 may be configured to access memory 138 of wristband 130 to store received input or to execute commands, processes, or programs stored in memory 138. In one implementation, processor 115 of computer device 110 accesses memory 138 of wristband 130 using wristband application 121. As such, computer device 110 can utilize memory 138 of wristband 130 in order to expand its own memory capabilities.

It should further be noted that the implementation of FIG. 1 illustrates memory 138 as being installed in wristband 130, however, the present disclosure is not limited to memory 138 being installed in wristband 130. In one implementation, memory 138 may be an external memory that can be inserted into and removed from wristband 130. For example, a user of wristband 130 may wish to add additional memory to wristband 130 that can be utilized by either wristband 130 or computer device 110. The user may then either add additional memory to an additional memory slot (not shown) in wristband 130 or exchange the current memory in wristband 130 with a memory that has a greater storage capacity. Furthermore, once the memory is removed from wristband 130, the user may plug that memory into an additional device, such as a computer, and either download programs, video, images, voice or any other data stored on the memory to the additional device or load programs video, images, voice or any other data on the memory from the additional device that can be utilized by wristband 130 or computer device 110.

As further illustrated in FIG. 1, memory 115 of computer device 110 includes wristband application 121. Wristband application 121 may have come preloaded on computer device 110, been downloaded and installed on computer device 110 from wristband 130, or been downloaded and installed on computer device 110 from another source. A user of computer device 110 can use wristband application 121 to control and customize wristband 130. For example, a user of computer device 110 may use wristband application 121 to install activation patterns 142, identities 143, and characters 144 in memory 138 of wristband 130. As a second example, as discussed above, wristband application 121 may be used by computer device 110 to store additional processes and applications in memory 138 of wristband 130. In such an example, computer device 110 can expand its own memory by utilizing memory 138 of wristband 130.

As further illustrated in FIG. 1, wristband application 121 includes communication module 122. Communication module 122 for communicating information or signals between computer device 110 and wristband 130 using communication interface 120, for example, in response to computer device 110 receiving a phone call or message, such as, but not limited to, a text message, an email, or any other type of message that can be transmitted between electronic devices. For example, in response to computer device 110 receiving a phone call, communication module 122 may transmit one or more signals to wristband 130 in order to trigger one or more activation patterns 142, a display of one of identities 143, and/or a display one of characters 144 using lights 140 of wristband 130.

As further illustrated in FIG. 1, wristband 130 includes circuitry 133 that controls lights 140. Lights 140 may each correspond to a light-emitting-diode (LED) or any other type of light source visible on a surface of wristband 130. As such, circuitry 133 may activate lights 140 to turn on and off, control the intensity of lights 140, and control the color of lights 140. As will be explained in greater detail below, lights 140 may be customized so that circuitry 133 can activate lights 140 according to activations patterns 142, identities 143, and characters 144 in response to wristband 130 receiving one or more signals from communication module 122 of computer device 110.

Activation patterns 142 can include different patterns for activating one or more of lights 140, different intensities for the one or more of lights 140 being activated, and/or different activation colors for the one or more of lights 140 being activated. For example, a first activation pattern of activation patterns 142 may specify that all lights 140 on wristband 130 to light up as blue when signals received from communication module 122 have been programmed to specify that a user's mom is calling computer device 110. As another example, a second activation pattern of activation patterns 142 may activate some lights 140 on wristband 130 to flash red when signals received from communication module 122 have been programmed to specify that an unknown number is calling. A user of wristband 130 can use wristband application 121 on computer device 110 to set or change activation patterns 142 depending on the type of phone call or message received by computer device 110.

Identities 143 may correspond to a phone book residing in computer device 130, which may also be loaded on wristband 130 from computer device 110 using wristband application 121. As such, identities 143 may include the names and phone numbers of contacts of a user of computer device 110. Communication module 122 will then specify who is calling or messaging computer device 110 and wristband 130 can use identities 143 to display the name or phone number of the person using lights 140. For example, if computer device 110 receives a phone call or a message, computer device 110 may transmit the number of who is calling or who is messaging to wristband 130 using communication module 122. Wristband 130 may then use the number and determine if the number corresponds to a contact from identities 143. If the number does correspond to a contact from identities 143, then wristband 130 may display the name of the contact using lights 140. Rather than transmitting the number, wristband 130 may transmit a name to be displayed on wristband 130 using lights 140. If the number does not correspond to a contact from identities 143, then wristband 130 may just display the number using lights 140.

Characters 144 may include a number of real or animated characters or objects that a user of wristband 130 can match to contacts in identities 143. If a contact from identities 143 includes a character match from characters 144, then wristband 130 may display the character using lights 140 instead of the name or phone number of the contact. Furthermore, if the number that is transmitted by device 110 to wristband 130 is not one of the contacts in identities 143, wristband 130 may be configured to pick a random or selected character from characters 144 to display using lights 140.

Characters 144 may include alphabets, numerals, logos, cartoon characters, images, animations, etc., which can be selected using wristband application for being displayed using lights 140 on wristband 130. A user may program the selection of characters 144, such that they are changed automatically after a predetermined amount of time or in response to an event. For example, lights 144 may display a Laker's logo when an event indicates that Laker's has won a game. As another example, lights may display a name of a favorite sportsman, singer, etc.

It should be noted that the implementation of FIG. 1 illustrates that each of activation patterns 142, identities 143, and characters 144 are stored in memory 138 of wristband 130, however, the present disclosure is not limited to having activation patterns 142, identities 143, and characters 144 stored in memory 138 of wristband 130. In one implementation, each of activation patterns 142, identities 143, and characters 144 may be stored in memory 115 of computer device 110. In such an implementation, computer device 110 may transmit communication module 122 to wristband 130, where communication module 122 corresponds to an activation pattern, an identity, or a character that is to be displayed on wristband 130 using lights 140. Still in another implementation, each of activation patterns 142, identities 143, and characters 144 may be stored on an external device other than computer device 110, wristband 130, and earpiece 150. In such an implementation, wristband 130 may be in communication with the external device using communication interface 137. Wristband 130 may then select and load an activation pattern, identity, or character from the external device depending on communication module 122 transmitted from computer device 110.

As further illustrated in FIG. 1, wristband 130 includes battery 134 and battery port 135. Battery 134 may be the power source for wristband 130. As such, battery 134 may include, but is not limited to, an alkaline battery, a lithium ion battery, a mercury battery, a nickel cadmium battery, or any other type of power source capable of powering wristband 130. In one implementation, battery 134 may be rechargeable using battery port 135. In such an implementation, a battery charger may be plugged into battery port 135 and an external power source in order to charge battery 134, as illustrated in FIG. 2. In another implementation, battery 134 may be replaceable. In such an implementation, battery 134 may be removed from wristband 130 and replaced by a similar battery.

It should be noted that battery 113 and battery port 114 of computer device 110, and battery 155 and battery port 156 of earpiece 150 are similar to battery 134 and battery port 135 of wristband 130, respectively. For example, battery 113 may be the power source of computer device 110 and may be rechargeable using battery port 114. As another example, battery 155 may be the power source of earpiece 150 and may be rechargeable using battery port 156. Furthermore, in one implementation, each of battery port 114, battery port 134, and battery port 156 may be designed so that the same battery charger interface can be used to recharge each of battery 113, battery 134, and battery 155, respectively. In such an implementation, each of battery port 114, battery port 134, and battery port 156 may include the same shape that match the battery charger that plugs into an external power source. In other words, battery port 114, battery port 134, and battery port 156 may have the same female receiving shape, such that they receive the same male battery charger input.

As further illustrated in FIG. 1, wristband 130 includes device charger 131 connected to or plugged into battery port 114 of computer device 110, e.g. device charger 131 may be a male battery charger input that is plugged into a female receiver of battery port 114 of computer device 110. Wristband 130 may use device charger 114 to either recharge battery 113 of computer device 110 or provide power to computer device 110. Wristband 130 can recharge battery 114 of computer device 110 or provide power to computer device 110 either when wristband 130 is being recharged using a battery charger plugged into battery port 135, or when wristband 130 is not being recharged. As such, battery 113 of computer device 110 can be recharged without plugging a separate battery charger into battery port 114 that requires a wall outlet. As a result, a user of computer device 110 can use computer device 110 for longer periods of time using battery 134 of wristband 130.

It should be noted that the implementation of FIG. 1 illustrates device charger 131 as being separate from connection mechanism 136, however, the present disclosure is not limited to device charger 131 being separate from connection mechanism 136. In one implementation, the connection between connection mechanism 136 of wristband 130 and connection mechanism 116 of computer device 110 may provide the components necessary for wristband 130 to recharge battery 113 of computer device 110. For example, in one implementation, device charger 131 may be installed in connection mechanism 136 and connection mechanism 136 may plug directly into battery port 114 of computer device 110. As another example, in another implementation, device charger 131 may be installed in connection mechanism 136 and a separate battery port for computer device 110 may be installed in connection mechanism 116, so that wristband 130 can recharge computer device 110 when connection mechanism 136 is connected to connection mechanism 116.

Furthermore, in one implementation, computer device 110 may utilize the same connection between battery port 114 and device charger 131 to charge battery 134 of wristband 130. Also, in another implementation, computer device 110 may utilize the connection between battery port 114 and device charger 131 to provide power to wristband 130. In such an implementation, wristband 130 may not require battery 134 since battery 113 of computer device 110 would power wristband 130.

It should further be noted that in one implementation, wristband device 130 may include a light that indicates a charge level of battery 113 of computer device 110 and/or battery 134 of wristband 134, as illustrated in FIG. 2. For example, the light may glow green when the batteries are near fully charged, the light glows yellow when the batteries are about half charged, and the light glows red when the batteries are almost out of charge. In another implementation, the light may be a bar indicating the battery level for battery 113 and/or battery 134. Furthermore, in one implementation, wristband 130 may transmit signals to computer device 110 that include a charge level of battery 134 of wristband 130. In such an implementation, wristband 130 may transmit the signals to computer device 110 using communication interface 137 and computer device 110 may display the charge level of wristband 130 using wristband application 121 on display 117. Also, in one implementation, computer device 110 may display a charge level for both battery 114 of device 110 and battery 134 of wristband 130 on display 117 using wristband application 121. In such an implementation, computer device 110 may display the charge level while wristband 130 is recharging battery 114.

It should be noted that the implementation of FIG. 1 illustrates device charger 131 as being separate from communication interface 137, however, the present disclosure is not limited to device charger 131 being separate from communication interface 137. In one implementation, device charger 137 may include the components of communication interface 137, so that wristband 130 is able to communicate with computer device 110 through device charger 131 of wristband 130 and battery port 114 of computer device 110 when device charger 131 is plugged into battery port 114. For example, signals may be communicated via the wired connection established between device charger 131 and battery port 114. These signals may exchange data between computer device 110 and wristband 130 using various data communication methods, such as pulse width modulation, or any other analog or digital data communications using one or more wireline connections.

Also illustrated in FIG. 1, wristband 130 includes earpiece charger 139. Earpiece charger 139 works similarly to device charger 131; however, earpiece charger 139 is utilized by wristband 130 to recharge battery 155 of earpiece 150. As such, earpiece charger 139 may be utilized similarly to device charger 131 and be plugged into battery port 156 of earpiece 150.

It should be noted that the implementation of FIG. 1 illustrates attaching mechanism 154 being separate from battery port 156; however, the present disclosure is not limited to attaching mechanism 154 being separate from battery port 156. In one implementation, attaching mechanism 154 may include battery port 156 and attach to earpiece charger 139 of wristband 130. In such an implementation, battery 155 of earpiece 150 will recharge when earpiece 150 is attached to wristband 130.

As further illustrated in FIG. 1, earpiece 150 includes speaker 152 and microphone 153. A user of earpiece 150 may be able to communicate with computer device 110, wristband 130 and/or a phone. As such, speaker 152 and microphone 153 of earpiece 150 may be utilized to replace speaker 118 and microphone 119 of computer device 110 (or a phone separate from computer device 110) when earpiece 150 is activated. For example, during a phone call, a user of earpiece 150 may be able to hear the other caller using speaker 153 or may be able to speak to the caller using microphone 153. As another example, when sending a text message, a user may be able to speak the content of the text message into microphone 153, so that computer device 110 can draft the text message.

It should be noted that the implementation of FIG. 1 illustrates earpiece 150 including both speaker 152 and microphone 153, however, the present disclosure is not limited to earpiece 150 including both speaker 152 and microphone 153. In other implementations, earpiece 150 may only include one of speaker 152 and microphone 153. For example, in one implementation, earpiece 150 may only include speaker 152, and not microphone 153. In such an implementation, a user of computer device 110 may utilize speaker 152 of earpiece 150 to listen to a caller on computer device 110, however, the user would use microphone 119 of computer device 110 to talk to the caller on computer device 110. Further, in another implementation, computer device 110 may not include a phone, and earpiece 150 may connect to a phone device (not shown) separate from computer device 110. In such an event, the communications may be performed wirelessly and directly between wristband 130 (and/or earpiece 150) and the phone device (not shown), or the communications may be performed wirelessly or via wires and indirectly through computer device 110 between wristband 130 (and/or earpiece 150) and the phone device, where computer device 110 is in communication with both wristband 130 (and/or earpiece 150) and the phone device.

In the implementation of FIG. 1, a user of wristband 130 may attach wristband 130 to computer device 110 using connection mechanism 136 and/or connection mechanism 116, and attach earpiece 150 to wristband 130 using attaching mechanism 154. The user may then plug device charger 131 of wristband 130 into battery port 114 of computer device 110, and plug earpiece charger 139 of wristband 130 into battery port 156 of earpiece 150 so that wristband 130 recharges both battery 113 of computer device 110 and battery 155 of earpiece 150.

Once the system has been setup by the user, the user may then use wristband application 121 of computer device 110 to program wristband 130 using activation patterns 142, identities 143, and characters 144. As discussed above, computer device 110 activates one of activation patterns 143, identities 143, and characters 144 using communication module 122, where communication module 122 communicates signals from computer device 110 to wristband 130 in response to computer device 110 receiving a phone call or message from an outside device. The message received by computer device 110 from the outside device may include, but is not limited to, a text message, and email, or any other type of message that can be transmitted between different devices. After wristband 130 receives signals from communication module 122 of computer device 110, processor 132 of wristband 130 activates lights 140 according to the one of activation patterns 142, identities 143, and characters 144 using circuitry 133.

The implementation of FIG. 1 further includes a user of wristband 130 utilizing earpiece 150. For example, when the user of wristband 130 receives a phone call on computer device 110, the user may detach earpiece 150 and utilize earpiece 150. Detaching earpiece 150 from wristband 130 may cause earpiece 150 to automatically detect that earpiece 150 has been detached from wristband 130 and turn on earpiece and/or establish a wireless connection, e.g. Bluetooth connection with computer device 110 or a phone device that is receiving a call.

FIG. 2 presents a first system illustrating a wristband accessory connected to a wearable computer, according to one implementation of the present disclosure. System 200 of FIG. 2 includes computer device 210, wristband 230, earpiece 250, external power source 270, and phone device 280. Computer device 210 includes connection mechanism 216a and connection mechanism 216b (collectively referred to as collection mechanisms 216), display 217, wristband application 221, and battery port 214. Wristband 230 includes device charger 231, battery 234, battery port 235, clasp 245, and charge light 271. Earpiece 250 includes attaching mechanism 254. As further illustrated in FIG. 2, computer device 210 includes first side 223 and second side 224, and wristband 230 includes first end 246 and second end 247.

It should be noted with respect to FIG. 2, computer device 210, battery port 214, connection mechanisms 216, display 217, wristband application 221, wristband 230, device charger 231, battery port 235, earpiece 250, and attaching mechanism 254 correspond respectively to computer device 110, battery port 114, connection mechanism 116, display 117, wristband application 121, wristband 130, device charger 131, battery port 135, earpiece 150, and attaching mechanism 154 of FIG. 1. It should further be noted that some features of FIG. 1 are not illustrated in FIG. 2 for clarity purposes.

As illustrated in FIG. 2, wristband 230 is connected to computer device 210 using connection mechanisms 216. First end 246 of wristband 230 attaches to first side 223 of computer device 210 using connection mechanism 216a, and second end 247 of wristband 230 attaches to second side 224 of computer device 210 using connection mechanism 216b. As discussed above, connection mechanisms 216 may include, but are not limited to, snaps, screws, adhesives, ties, or any other mechanism that can be used to connect wristband 230 to computer device 210. Once wristband 230 is attached to computer device 210, a user can wear computer device 210 around his or her wrist.

It should be noted that the implementation of FIG. 2 illustrates wristband 230 being attached to computer device 210 using connection mechanisms 216 of computer device 210, however, as discussed above, the present disclosure is not limited to wristband 230 being attached to computer device 210 using connection mechanisms that are only included on computer device 210. In one implementation, wristband 230 may be attached to computer device 210 using connection mechanisms that are included on wristband 230. In such an implementation, the connection mechanisms included on wristband 230 may include, but are not limited to, snaps, screws, adhesives, ties, or any other mechanism that can be used to connect wristband 230 to computer device 210. Furthermore, in another implementation, both wristband 230 and computer device 210 may include connection mechanisms that work together in order for wristband 230 to attach to computer device 210. For example, wristband 230 may include screws that screw into bolts on computer device 210.

As further illustrated in FIG. 2, wristband 230 includes battery 234. Battery 234 is indicated with dashed lines to indicate that battery 234 is inside wristband 230. In one implementation, as illustrated in FIG. 2, battery 234 may extend almost the entire length of wristband 230. In such an implementation, the size of battery 234 is maximized so that battery 234 is able to power wristband 230 and computer device 210 for longer periods of time. However, in another implementation, battery 234 may not extend the length of wristband 230. For example, battery 234 may only be provided on a single side of wristband 230, such as between clasp 245 and computer device 210.

As further illustrated in FIG. 2, wristband 230 includes device charger 231 plugged into battery port 214 of computer device 210. In one implementation, wristband 230 is connected to connection mechanism 216a such that device charger 231 is hidden inside wristband 230. In other words, connection mechanism 216a is extended such that wristband 230 covers first side 223, second side 224 and battery port 214. In one implementation, battery port 214 may be located on the same side as first side 223 or second side 224. As discussed above with regards to FIG. 1, each of wristband 230 and computer device 210 may include a separate battery. Wristband 230 may thus be used to provide power to computer device 210 and/or recharge the battery inside computer device 210, such as recharging battery 113 of computer device 110 from FIG. 1. As such, device charger 231 is plugged into battery port 214 in order to provide power to computer device 210 and/or recharge the battery inside computer device 210. Wristband 230 can recharge the battery inside computer device 210 while battery 234 of wristband 230 is being recharged using a battery charger plugged into battery port 235 of wristband 230 using external power source 270, where external power source 270 includes a power outlet or any other power source that may be used to recharge wristband 230. Furthermore, wristband 230 can provide power to computer device 210 and/or recharge the battery inside computer device 210 during normal use of wristband 230 and computer device 210 when wristband 230 is not connected to external power source 270.

As further illustrated in FIG. 2, wristband 230 includes clasp 245. Clasp 245 includes a part of wristband 230 that can be used to both adjust a size of wristband 230 for a given user and/or lock and secure wristband 230 to that user. For example, clasp 245 may include a series of holes lined up in a row so that a user can tighten wristband 230 to his or her wrist and then place a rod inside one of the holes to secure wristband 230 to his or her wrist. As another example, wristband 230 may come preset to fit the wrist of the user. In such an example, clasp 245 may only include a clip that secures wristband 230 to the user. A user would thus not be required to adjust the size of wristband 230 since wristband 230 would be sized to the correct size of the user.

It should be noted that in one implementation, as will be discussed in greater detail below with regards to FIG. 5, clasp 245 further includes a switch. In such an implementation, the switch will be automatically be activated or deactivated when a user of wristband 230 secures wristband 230 to his or her wrist. The switch may then cause wristband 230 to activate and/or transmit a signal to computer device 210 to activate computer device 210 depending on settings programmed by the user. For example, the switch may cause wristband 230 to transmit a signal to computer device 210 causing display 217 on computer device 210 to turn on. Computer device 210 may then further launch wristband application 221 in response to the signal. As a second example, the switch may cause wristband 230 to transmit a signal to computer device 210 causing computer device 210 to update software applications loaded on computer device 210, such as email or other messaging accounts. Also, as a third example, the signal transmitted from the switch may adjust an amount of power being provided from wristband 230 to computer device 210. For example, when clasp 245 is closed, the switch may transmit a signal, such that power is provided by battery 234 to computer device 210, and when clasp 245 is opened, the switch may transmit a signal, such that no power is provided by battery 234 to computer device 210. As illustrated in FIG. 1, wristband 130/230 may utilize communication interface 137 in order to transmit signals to computer device 110/210.

Also, as illustrated in FIG. 2, wristband 230 includes charge light 271. As discussed above in FIG. 1, wristband 230 may include lights that indicate the charge level for both battery 234 inside wristband 230 and the battery inside computer device 210. As such, wristband 230 may activate different lights within charge light 271 depending on the power level of the two different batteries.

FIG. 2 further illustrates earpiece 250 attached to wristband 230. Earpiece attaches to wristband 230 using attaching mechanism 254, where attaching mechanism 254 may include, but is not limited to, a snap, a screw, an adhesive, a tie, or any other mechanism that can be used to connect earpiece 250 to wristband 230. Furthermore, attaching mechanism 254 may include a battery port, such as battery port 156 of earpiece 150 from FIG. 1, so that wristband 230 can recharge the battery inside earpiece 250 while earpiece 250 is attached to wristband 230. Wristband 230 may include a built-in compartment for earpiece 250, such that earpiece 250 can be placed inside wristband 230 partially or completely.

Further illustrated in FIG. 2 is phone device 280. As discussed above in regards to FIG. 1, in one implementation, computer device 210 may not include a phone, and earpiece 250 may connect to phone device 280 separate from computer device 210. In such an implementation, the communications may be performed wirelessly and directly between wristband 230 (and/or earpiece 250) and phone device 280, or the communications may be performed wirelessly or via wires and indirectly through computer device 210 between wristband 230 (and/or earpiece 250) and phone device 230, wherein computer device 210 is in communication with both wristband 230 (and/or earpiece 250) and phone device 280.

It is noted that the implementation of FIG. 2 only illustrates computer device 210 as including wristband application 221, however, the present disclosure is not limited to only phone device 210 including wristband application 221. In one implementation, phone device 280 may also include wristband application 221. In such an implementation, phone device 280 is able to utilize wristband application 221 to control and send signals to wristband device 230, and receive signals from wristband device 230, as computer device 210 discussed above.

FIG. 3 presents a second system illustrating a wristband accessory connected to a wearable computer, according to one implementation of the present disclosure. System 300 of FIG. 3 includes computer device 310 and wristband 330. Wristband 330 includes connection mechanism 336. With regards to FIG. 3, it should be noted that computer device 310, wristband 330, and connection mechanism 336 correspond respectively to computer device 110, wristband 130, and connection mechanism 136 of FIG. 1. It should also be noted that some features from FIG. 1 have been left out of FIG. 3 for clarity purposes.

As illustrated in the implementation of FIG. 3, wristband 330 attaches to computer device 310 using connection mechanism 336. Connection mechanism 336 in FIG. 3 works as a pocket in wristband 330 that computer device 310 can fit inside. As such, wristband 330 is able to surround all four sides of computer device 310 so that computer device 310 is secured inside wristband 330. By having connection mechanism 336 of wristband 330 act as a pocket for a computer device, wristband 330 can be compatible to support different types of computer devices.

FIG. 4 presents a third system illustrating a wristband accessory connected to a wearable computer, according to one implementation of the present disclosure. System 400 of FIG. 4 includes computer device 410 and wristband 430. Computer device 410 includes display 417. Wristband 430 includes connection mechanism 436a and connection mechanism 436b, which are collectively referred to as collection mechanisms 436. With regards to FIG. 4, it should be noted that computer device 410, display 417, wristband 430, and connection mechanisms 436 correspond respectively to computer device 110, display 117, wristband 130, and connection mechanism 136 of FIG. 1. It should also be noted that some features from FIG. 1 have been left out of FIG. 4 for clarity purposes.

As illustrated in FIG. 4, wristband 430 now attaches to computer device 410 using connection mechanisms 436, where connection mechanism 436a is situated on a first side of wristband 430 and connection mechanism 436b is situated on a second side of wristband 430. By having connections mechanisms 436 included on each side of wristband 430, computer device 410 does not have to specifically be designed for attachment to wristband 430 as wristband 430 is a general wristband that can be used with a variety of computer devices. For example, wristband 430 can be detached from computer device 410 and attached to a second computer device.

Figure 5:
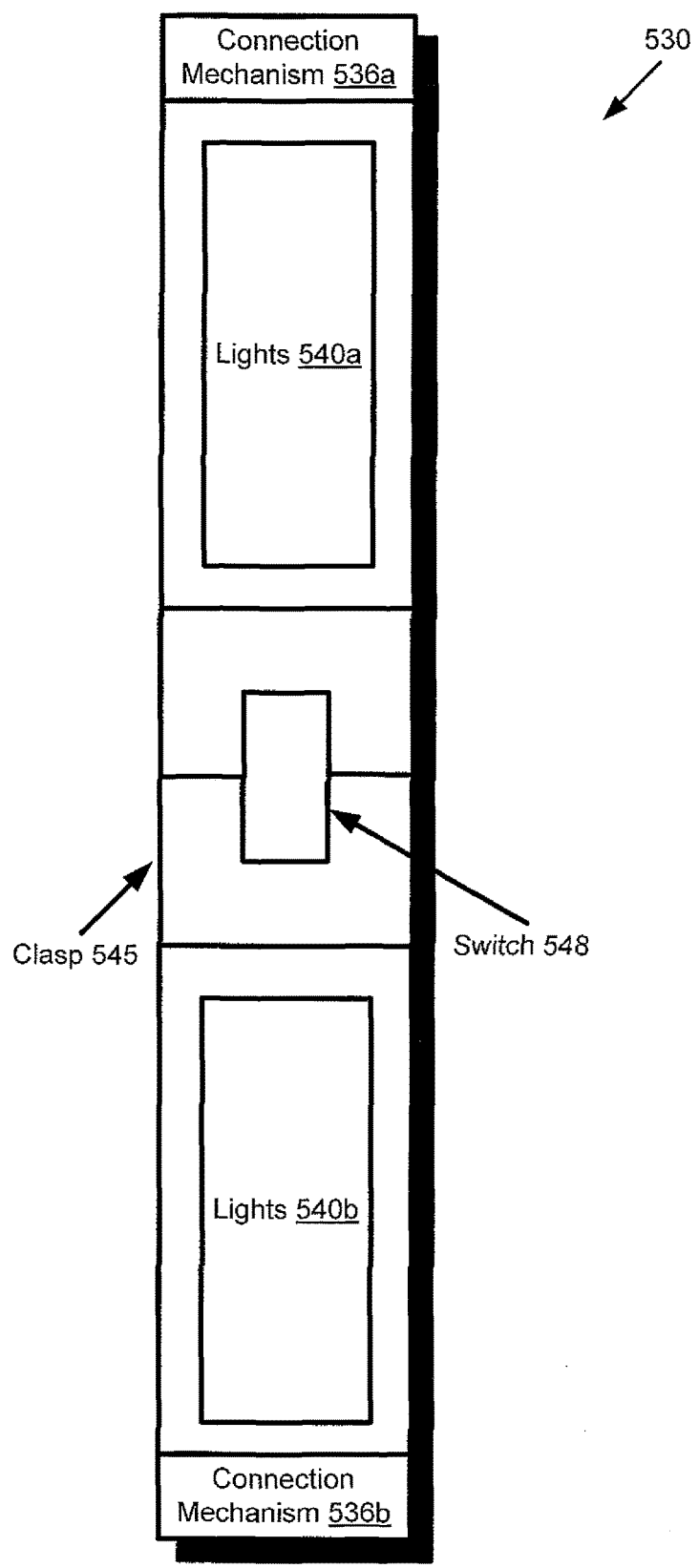
FIG. 5 presents a first example of a wristband accessory, according to one implementation of the present disclosure.

FIG. 5 presents a first example of a wristband accessory, according to one implementation of the present disclosure. Wristband 530 of FIG. 5 includes lights 540a and lights 540b, which are collectively referred to as lights 540, and connection mechanism 536a and connection mechanism 536b, which are collectively referred to as collection mechanisms 536. Wristband 530 further includes clasp 545, which includes switch 548. With respect to FIG. 5, it should be noted that wristband 530, connection mechanisms 536, and lights 540 of FIG. 5 correspond respectively to wristband 130, connection mechanism 136, and lights 140 of FIG. 1.

As illustrated in FIG. 5, wristband 530 includes connection mechanism 536a on a first end and connection mechanism 536b on a second end. Connection mechanisms 536 are utilized by wristband 530 in order to attach wristband 530 to a computer device, such as by attaching wristband 130 to computer device 110 of FIG. 1. Furthermore, as discussed above, in some implementations, one or both of connection mechanisms 536 may also include the necessary components needed to set up communications between wristband 530 and a device and/or the exchange of power between wristband 530 and the device. For example, and referring to FIG. 1, connection mechanisms 536 may include device charger 131 and/or communication interface 137. In such an example, wristband 130/530 is able to both transmit and receive communications to and from computer device 210 and recharge battery 113 of computer device 110 when wristband 130/530 is connected to computer device 110.

As further illustrated in FIG. 5, wristband 530 includes lights 540a on a first end and lights 540b on a second end. As discussed above, lights 540 may include LEDs that can be activated using signals transmitted from a computer device, such as computer device 110 from FIG. 1. Lights 540 may be programmed by a user to activate according to different activation patterns, activate to display an identity of a caller, or activate to display a character that corresponds to the identity of the caller. In this way, a user of wristband 530 is able to customize wristband 530 depending on his or her own preferences.

As further illustrated in FIG. 5, wristband 530 includes clasp 545, which includes switch 548, such as a transistor. As discussed above, clasp 545 may be used to both adjust a size of wristband 530 for a given user and/or lock and secure wristband 530 to that user. Furthermore, in the implementation of FIG. 5, clasp 545 includes switch 548. Switch 548 may be configured to activate when a user of wristband 530 closes clasp 545 so that wristband 530 and an attached device are secured to his or her wrist. Once switch 548 has been activated by locking clasp 545, wristband 530 may be configured to perform various functions.

For example, in one implementation, and as discussed above, activating switch 548 may cause wristband 530 to transmit a signal to an attached computer device. The transmitted signal may cause the attached computer device to turn on, launch, and update software applications stored on the attached device. For example, the signal may cause the computer device to launch an email application so that the device automatically launches, updates, and displays the email application each time a user closes clasp 545. For another example, the signal may cause the computer device to launch a wristband application, such as wristband application 121 of FIG. 1. A user can then customize wristband 530 according to user preferences using the wristband application.

Figure 6:
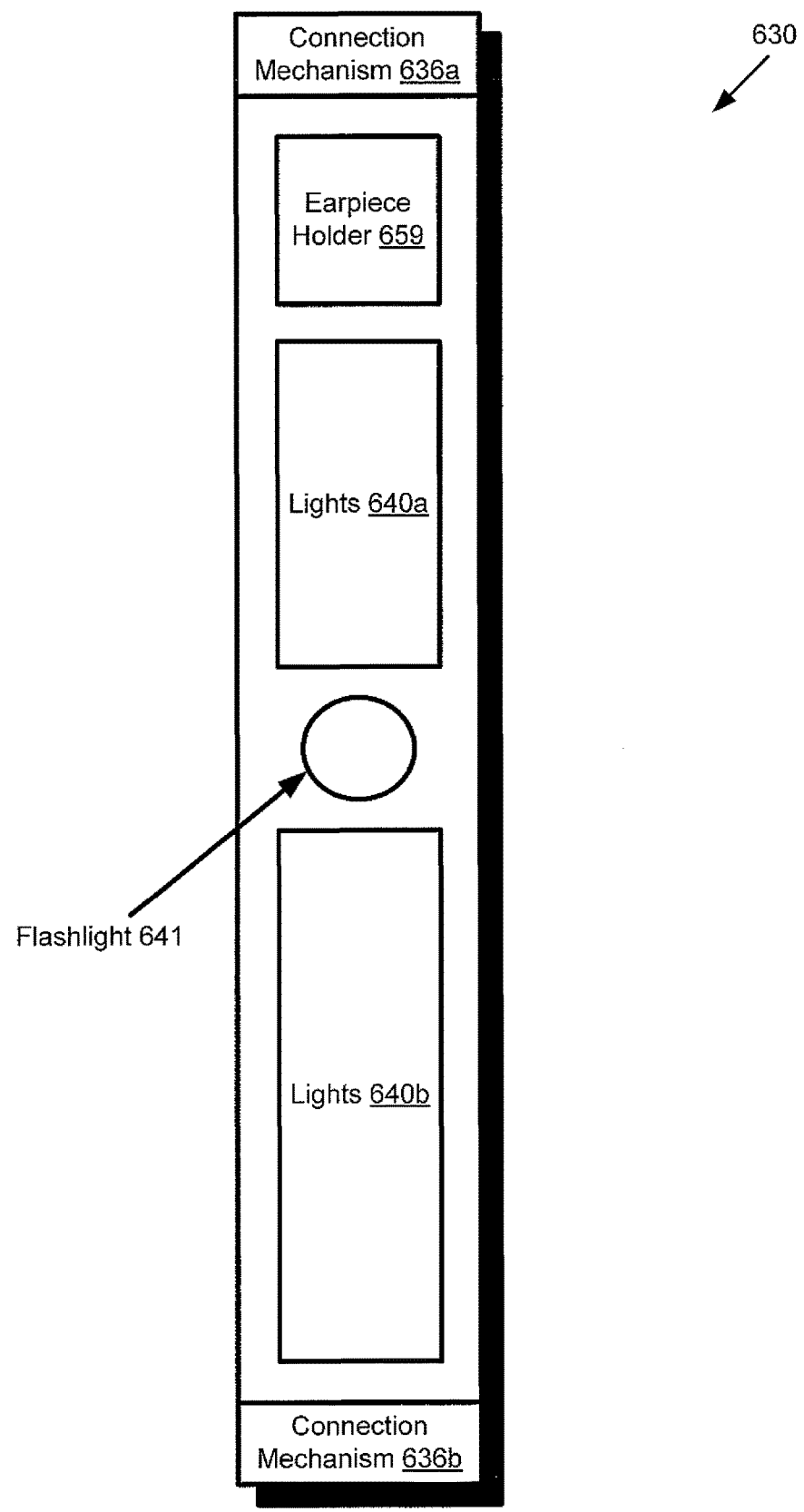
FIG. 6 presents a second example of a wristband accessory, according to one implementation of the present disclosure.

FIG. 6 presents a second example of a wristband accessory, according to one implementation of the present disclosure. Wristband 630 of FIG. 6 includes connection mechanism 636a and connection mechanism 636b, which are collectively referred to as connection mechanisms 636, and lights 640a and lights 640b, which are collectively referred to as lights 640. Furthermore, wristband 630 includes flashlight 641 and earpiece holder 659. With regards to FIG. 6, it should be noted that wristband 630, connection mechanisms 636, lights 640, and flashlight 641 correspond respectively to wristband 130, connection mechanism 136, lights 140 of FIG. 1. As shown, in one implementation, flashlight 641 is placed near or on the clasp, such that flashlight 641 can be used as a reading assistant when flashlight 641 is facing a reading surface with a hand wearing wristband 630 is held on top of the surface or when the hand is rested on the little finger side shining light sideways on the surface.

As illustrated in the implementation of FIG. 6, wristband 630 includes flashlight 630 and earpiece holder 659. As discussed above, flashlight 630 may include a light source, such as an LED. Earpiece holder 659 may include a pouch built into wristband 630 where a user of wristband 630 can store an earpiece, such as earpiece 150 from FIG. 1. In one implementation, a pouch may be attached to wristband 630 for storing an earpiece therein.) By including earpiece holder 659 built into wristband 630, a user does not have to attach an earpiece to the outer perimeter of wristband 630 where it might be knocked off. Furthermore, earpiece holder 659 may include the components necessary to recharge a battery in the earpiece while the earpiece is stored inside earpiece holder 659.

It should be noted that FIGS. 2-6 are just example implementations of wristbands that may be utilized with a computer device, however, the present disclosure is not limited to the implementations of FIGS. 2-6. In other implementations, each of device charger, lights, connection mechanisms, earpiece charger, and earpiece holder may be arranged using a different arrangement. Furthermore, still in other implementations, the wristband may include more or less features than device charger, lights, connection mechanisms, earpiece charger, and earpiece holder.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A wearable computer device comprising:
a computer body, the computer body including a processor and a display; and
an earpiece; and
a wristband, the wristband including:
a first end of the wristband configured to attach to a first side of the computer body;
a second end of the wristband configured to attach to a second side of the computer body; and
an earpiece compartment configured to receive the earpiece;
wherein the earpiece is configured to detect a detachment from the wristband, and wherein the earpiece turns on in response to detecting the detachment from the wristband and establishes direct wireless connections to at least two devices, said at least two devices comprising at least said computer body and a phone.

2. The wearable computer device of claim 1, wherein the wristband is configured to provide power to the earpiece while the earpiece is placed inside the wristband.

3. The wearable computer device of claim 2, wherein the wristband further includes a battery, and wherein the battery of the wristband provides power to a battery of the earpiece.

4. The wearable computer device of claim 1, wherein the earpiece includes a speaker and no microphone.

5. The wearable computer device of claim 1, wherein the earpiece compartment is configured for partially placing the earpiece in the earpiece compartment.

6. The wearable computer device of claim 1, wherein the wireless device is inside the wristband.

7. A wristband for attaching to a computer device, the wristband comprising:
- a first end of the wristband configured to attach to a first side of the computer device;
- a second end of the wristband configured to attach to a second side of the computer device; and
- an earpiece compartment for placing an earpiece in the wristband, wherein the earpiece is configured to detect a detachment from the wristband, and wherein the earpiece turns on in response to detecting the detachment from the wristband and establishes direct wireless connections to at least two devices, said at least two devices comprising at least said computer device and a phone.

8. The wristband of claim 7, wherein the wristband is configured to provide power to the earpiece while the earpiece is placed inside the wristband.

9. The wristband of claim 8, wherein the wristband further includes a battery, and wherein the battery of the wristband provides power to a battery of the earpiece.

10. The wristband of claim 7, wherein the earpiece includes a speaker and no microphone.

11. The wristband of claim 7, wherein the earpiece compartment is configured for partially placing the earpiece in the earpiece compartment.

12. The wristband of claim 7, wherein the wireless device is inside the wristband.

* * * * *